(12) United States Patent
Panah et al.

(10) Patent No.: US 8,565,331 B2
(45) Date of Patent: Oct. 22, 2013

(54) INSERTING AND DECODING REPLICATED DATA SYMBOLS IN WIRELESS COMMUNICATIONS

(75) Inventors: Ali Yazdan Panah, Austin, TX (US); Robert W. Heath, Jr., Austin, TX (US)

(73) Assignee: The Board of Regents of the University of Texas System, Austin, TX (US)

( * ) Notice: Subject to any disclaimer, the term of this patent is extended or adjusted under 35 U.S.C. 154(b) by 309 days.

(21) Appl. No.: 12/999,029

(22) PCT Filed: Aug. 20, 2010

(86) PCT No.: PCT/US2010/046106
§ 371 (c)(1),
(2), (4) Date: Dec. 14, 2010

(87) PCT Pub. No.: WO2012/023944
PCT Pub. Date: Feb. 23, 2012

(65) Prior Publication Data
US 2012/0045007 A1    Feb. 23, 2012

(51) Int. Cl.
*H04B 7/02* (2006.01)
(52) U.S. Cl.
USPC .......................................................... 375/267
(58) Field of Classification Search
USPC ................... 375/260, 267, 299, 347
See application file for complete search history.

(56) References Cited

U.S. PATENT DOCUMENTS

| | | | |
|---|---|---|---|
| 6,519,296 B1 | 2/2003 | Hladik | |
| 7,397,862 B2 | 7/2008 | Ouyang et al. | |
| 7,522,682 B2 | 4/2009 | Obernosterer et al. | |
| 7,778,337 B2 | 8/2010 | Tong et al. | |
| 2002/0122381 A1 | 9/2002 | Wu et al. | |
| 2007/0135166 A1* | 6/2007 | Ding et al. | 455/561 |
| 2008/0043857 A1* | 2/2008 | Ribeiro Dias et al. | 375/260 |
| 2010/0202559 A1* | 8/2010 | Luo et al. | 375/295 |
| 2011/0026447 A1* | 2/2011 | Lim et al. | 370/310 |
| 2011/0171944 A1* | 7/2011 | Kobayashi et al. | 455/418 |

OTHER PUBLICATIONS

Cheon, H. et al., "Performance Analysis of Space-Time Block Codes in Time-Varying Rayleigh Fading Channels", IEEE International Conference on Acoustics, Speech, and Signal Processing, 2002. Proceedings. (ICASSP '02)., vol. 3, pp. III-2357-III-2360.

Cirpan, H. A. et al., "Nondata-Aided Channel Estimation for OFDM Systems With Space-Frequency Transmit Diversity", IEEE Transactions on Vehicular Technology, Mar. 2006, vol. 55, No. 2, pp. 449-457.

Kleider, J. E., "MISO joint synchronization-pilot design for OFDM systems", IEEE International Conference on Acoustics, Speech and Signal Processing, 2008. ICASSP 2008., Mar. 31-Apr. 4, 2008, pp. 3033-3036.

(Continued)

*Primary Examiner* — Don N Vo
(74) *Attorney, Agent, or Firm* — Dorsey & Whitney LLP

(57) ABSTRACT

Examples are generally described that include transmission methods including inserting at least a portion of data from a first data stream into a second data stream to be transmitted over a communications channel. On receipt of the two data streams, examples of receiving methods include receiving the replicated data, decoding the replicated data using an estimated channel matrix, and generating an updated estimate of the channel matrix based, at least in part, on the replicated data.

8 Claims, 7 Drawing Sheets

(56) References Cited

OTHER PUBLICATIONS

Lee, K. F. et al., "A Space-Frequency Transmitter Diversity Technique for OFDM Systems", Proc. IEEE Global Telecommunications Conf. (GLOBECOM), 2000, vol. 3, pp. 1473-1477.

Li, W. et al., "Effects of channel-estimation errors on receiver selection-combining schemes for Alamouti MIMO systems with BPSK", IEEE Transactions on Communications, Jan. 2006, vol. 54, No. 1, pp. 169-178.

Lu, H., "PHY 45-4—Reduced-Complexity ICI Mitigation for Mobile SFBC-OFDM with Application to DVB-H", IEEE Wireless Communications and Networking Conference, 2008. WCNC 2008., Mar. 31-Apr. 3, 2008, pp. 1183-1187.

Stamoulis, A. et al., "Intercarrier Interference in MIMO OFDM", IEEE Transactions on Signal Processing, Oct. 2002, vol. 50, Issue.10, pp. 2451-2464.

Sun, Y. et al., "EM-based iterative receiver design with carrier-frequency offset estimation for MIMO OFDM systems", IEEE Transactions on Communications, Apr. 2005, vol. 53, Issue: 4, pp. 581-586.

Xiaoqiang, M. A. et al., "An EM-Based Channel Estimation Algorithm for Space-Time and Space-Frequency Block Coded OFDM", IEEE International Conference on Acoustics, Speech, and Signal Processing, 2003. Proceedings. (ICASSP'03)., Apr. 6-10, 2003, vol. 4, pp. IV-389-IV-392.

Yang, H., "A road to future broadband wireless access: MIMO-OFDM-Based air interface", Communications Magazine, IEEE, Jan. 2005, vol. 43, Issue: 1, pp. 53-60.

"International Search Report dated Nov. 9, 2010 for Application No. PCT/US2010/046106".

* cited by examiner

INSERTING AND DECODING REPLICATED DATA SYMBOLS IN WIRELESS COMMUNICATIONS

BACKGROUND

Unless otherwise indicated herein, the materials described in this section are not prior art to the claims in this application and are not admitted to be prior art by inclusion in this section.

Multiple-input multiple-output (MIMO) communication systems employ multiple transmit antennas and multiple receive antennas to communicate data symbols over a communications channel. MIMO communication systems may allow a plurality of mobile stations to be serviced utilizing a same frequency band. In this manner, MIMO communication systems may advantageously increase an amount of data the communication systems is able to send to users.

MIMO systems may find use in a variety of applications including, but not limited to, wireless networks, cellular systems including 3G and 4G systems, such as 3GPP LTE-Advanced, local and wide area networks, and wireless broadband systems (such as WiMAX).

Generally, a transmitter in a MIMO system may have a plurality of antennas. Receiving devices may each have a single antenna for receipt of data over the communications channel, or may have multiple antennas.

The communications channel, however, may introduce a variety of non-idealities to a transmitted signal, such as may be caused by multipath interference, reflections, motion of one or more mobile stations, or other properties of a communications channel. The signals received by a receiver over the communications channel may be related to the transmitted signals by a channel matrix H. The channel matrix generally refers to a matrix of data which may represent the operation of the communications channel on the transmitted data symbols, including representations of such effects as reflections.

Orthogonal frequency division multiplexing (OFDM) modulation techniques may be used to modulate data for transmission over a communications channel. OFDM generally involves modulating different portions of the data to be transmitted using different sub-carrier frequencies.

Block coding techniques may be used in communication systems to encode data and transmit multiple data streams over a communications channel, which may improve the reliability of data transfer. Block coding techniques include space-time block coding, which may transmit multiple data streams across multiple antennas. Alamouti space time block coding is one particular type of space-time block coding known in the art. Space-time block coding techniques may require that the communications channel be constant during consecutive data transmission times, which may not always be advantageous. Another type of block coding technique is space-frequency block coding. Alamouti space-frequency block coding is one particular type of space-frequency block coding known in the art. Space-frequency block coding techniques may require that different frequencies experience similar communications channel properties, which may be more advantageous in some cases.

Block coding techniques may commonly be used in conjunction with OFDM. Decoding of block encoded OFDM transmissions may require knowledge of properties of the communications channel over which the transmission is received. Accordingly, systems utilizing block encoded OFDM transmissions generally measure one or more properties of the communications channel, such as the channel matrix. One way to measure properties of the communications channel is to insert pilot symbols into the transmitted data streams. The pilot symbols may be known to the receiver and the known pilot symbols may be compared with the received signals to generate an estimate of one or more properties of the communications channel. The need to insert pilot symbols into the transmitted data streams may adversely effect a data rate attainable in the communications system.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several examples in accordance with the disclosure and are, therefore, not to be considered limiting of its scope, the disclosure will be described with additional specificity and detail through use of the accompanying drawings, in which:

In the drawings.

SUMMARY

Figure 1:
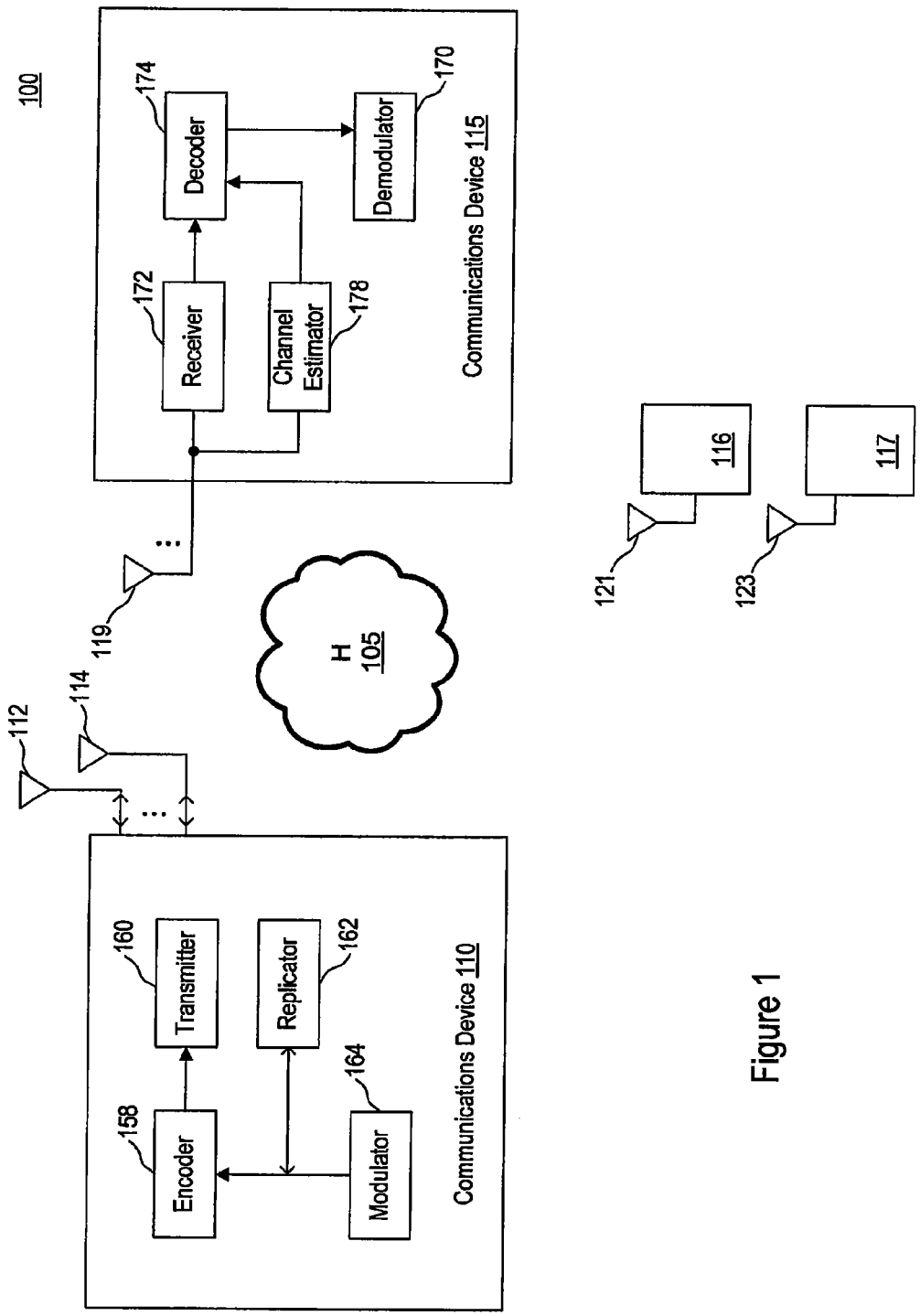
FIG. 1 is a schematic illustration of an example system that is configured for communication over a communications channel in accordance with at least some examples of the present disclosure.

The present disclosure describes a method of transmitting data over a communications channel. Some example methods may include modulating data, inserting data from one stream into another stream, and/or transmitting the data streams over a communications channel. The modulation may be performed in accordance with an orthogonal frequency division multiplexing technique, and may generate at least a first and second data stream for transmission using respective transmit antennas. The inserting may insert at least a portion of data from the first data stream into the second data stream.

The present disclosure describes methods of decoding a signal transmitted over a communications channel. Example methods may include, receiving a pilot symbol over the communications channel, estimating a channel matrix of the communications channel based, at least in part, on the pilot symbol, receiving replicated data from multiple data streams transmitted over the communications channel, decoding the replicated data using the estimated channel matrix, and/or generating an updated estimate of the channel matrix based, at least in part, on the replicated data.

The present disclosure describes communications devices. Example communications devices may include a modulator, a replicator, an encoder, and/or a transmitter. The modulator may be configured to modulate data in accordance with an orthogonal frequency division multiplexing technique for transmission over a communications channel using at least a first and a second transmit antenna. The modulator may be further configured to generate at least a first data stream for transmission with the first antenna and a second data stream for transmission with the second antenna. The replicator may be coupled to the modulator and configured to receive the first and second data streams. The replicator may also be configured to insert at least one data symbol from the first data stream into the second data stream. The encoder may be coupled to the replicator and may be configured to receive the first and second data streams including the inserted at least one symbol. The encoder may be configured to encode the first and second data streams in accordance with a block coding technique. The transmitter may be coupled to the encoder and may be configured to receive the encoded first and second data streams. The transmitter may be configured to transmit the first data stream over the communications channel using the first antenna and further configured to transmit the second data stream including the inserted at least one symbol over the communications channel using the second antenna.

Example communications devices may include a receiver, a decoder, and/or a channel estimator. The receiver may be configured to receive signals over a communications channel, wherein the signals are based at least in part on first and second data streams transmitted over a communications channel, wherein the second data stream includes at least one data symbol replicated from the first data stream. The decoder may be coupled to the receiver and the channel estimator. The decoder may be configured to receive the received signals and decode the at least one data symbol replicated from the first data stream. The channel estimator may be coupled to the decoder and the receiver, and may be configured to receive the received signals and the decoded at least one data symbol. The channel estimator may be configured to estimate a channel matrix of the communications channel based, at least in part, on the decoded at least one data symbol. The decoder may also be configured to decode subsequent received signals based, at least in part, on the estimate of the channel matrix.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

The following detailed description, reference is made to the accompanying drawings, which form a part hereof. In the drawings, similar symbols typically identify similar components, unless context dictates otherwise. The illustrative examples described in the detailed description, drawings, and claims are not meant to be limiting. Other examples may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are implicitly contemplated herein.

This disclosure is drawn, inter alia, to methods, systems, devices, and/or apparatus generally related to use of replicated data as a pilot symbol in a communications system. Examples of transmission methods include inserting at least a portion of data from a first data stream into a second data stream to be transmitted over a communications channel. On receipt of the two data streams, examples of receiving methods include receiving the replicated data, decoding the replicated data using an estimated channel matrix, and generating an updated estimate of the channel matrix based, at least in part, on the replicated data.

FIG. 1 is a schematic illustration of an example system that is configured for communication over a communications channel in accordance with at least some examples of the present disclosure. A system 100 may be a multiuser multiple-input multiple-output system configured for communication over a communications channel 105. System 100 may include a communications devices 110, 115, 116, and/or 117. The communications devices may be operated by users (not shown).

The communications device 110 may be implemented as a base station and may be configured to communicate with multiple mobile stations 115, 116, and 117. The communications device 110 may include antennas 112 and 114, which may be utilized to communicate over the communications channel 105 using multiple antennas for spatial diversity to communicate with multiple users over each frequency.

The communications device 110 may include antennas 112 and 114, an encoder 158, a transmitter 160, a replicator 162, and/or a modulator 164. Antennas 112 and 114 may be coupled to the transmitter 160. The encoder 158 may be coupled to transmitter 160. The modulator 164 may be coupled to encoder 158. The replicator 162 may be coupled to modulator 164 and encoder 158.

The modulator 164 may be configured to receive data for transmission over the communications channel 105. The modulator 164 may be configured to modulate the data in accordance with one or more modulation techniques, such as orthogonal frequency division multiplexing (OFDM). Any suitable modulator may be used, and modulator 164 may be implemented in hardware, software, or combinations thereof. The modulator 164 may accordingly generate multiple data streams for communication over the communications channel, one for transmission using each of the respective antennas 112 and 114 in some examples. Pilot symbols may be inserted into the data streams by the modulator 164 or may be inserted before or after the modulator 164 in some examples.

The replicator 162 may be configured to receive one or more data streams generated by the modulator. The replicator 162 may be configured to replicate at least a portion of data from one data stream and insert the replicated data into another data stream, as will be described further below. Any suitable hardware, software, or combinations thereof may be used to implement the replicator 162, including a mixer.

The encoder 158 may be configured to receive one or more data streams generated by the modulator 164 and which may have been modified by the replicator 162. The encoder 158 may be configured to encode the data streams in accordance with a block encoding technique, such as space-time or space-frequency block coding, including in some examples Alamouti space-time or Alamouti space-frequency block coding.

The transmitter 160 may be configured to transmit the encoded data over the communications channel 105 via the cooperative operation of the transmitter 160 and one or more of antennas 112 and/or 114.

Although not shown in FIG. 1, the communications device 110 may also include components configured to receive, decode, and demodulate signals received over the communications channel. That is, the communications device 110 may both send and receive signals over the communications channel in some examples.

The communications device 115 may include antenna 119, a receiver 172, a decoder 174, a channel estimator 178, and/or a demodulator 170. Antenna 119 may be coupled to the receiver 172 and the channel estimator 178. The channel estimator 178 may also be coupled to the decoder 174. The demodulator 170 may be coupled to the decoder 174.

The receiver 172 is configured to cooperate with antenna 119 to receive signals over the communications channel 105 and provide the received signals to decoder 174. Although not shown in FIG. 1, in some examples, multiple antennas may be provided at the communications device 115. In examples using Alamouti encoding and decoding, however, a single receive antenna may generally be used to receive signals over the communications channel 105. Any suitable receiver may be used and the receiver 172 may be implemented in hardware, software, or combinations thereof. As will be described further below, the received signals may include data The decoder 174 may be configured to decode signals received from the receiver 172 to provide data. Any of a variety of decoding techniques may be used in accordance with a technique used to encode the signals received by the receiver 172. Examples of decoding techniques include block decoding techniques including space-time and space-frequency block decoding, and Alamouti space-time and space-frequency decoding in some examples. Any suitable decoder may be used and the decoder 174 may be implemented in hardware, software, or combinations thereof.

The demodulator 170 may be configured to demodulate decoded data from the decoder 174. The demodulator 170 may generally implement any demodulation technique, including demodulation in accordance with orthogonal frequency division multiplexing (OFDM) techniques. Any suitable demodulator may be used, and the demodulator 170 may be implemented in hardware, software, or combinations thereof.

The channel estimator 178 may be configured to estimate all or a portion of a channel matrix H associated with the communications channel 105. As will be described further below, the channel estimator 178 may utilize pilot symbols to estimate the channel matrix. The channel estimator 178 may also be configured to use decoded replicated data as a pilot symbol to estimate the channel matrix and/or update an estimate of the channel matrix. By utilizing replicated data to generate or update an estimate of the channel matrix, the communications device 115 may in some examples require fewer pilot symbols to be inserted into signals communicated over the communications channel 105. Reducing a number of pilot symbols inserted into the transmitted signals may advantageously improve the data rate of the communications system 100 in some examples.

Although not shown in FIG. 1, the communications device 115 may also include components such as a transmitter, encoder, and/or modulator, for transmitting signals over the communications channel 105. That is, in some examples, the communications device 115 may both transmit and receive signals over the communications channel.

Communications devices 116 and 117 may be similarly configured to communications device 115. The communications device 116 may include antenna 121. The communications device 117 may include antenna 123.

The communications channel 105 may generally include any suitable medium for transmitting electromagnetic signals. The communications channel 105 may be characterized by the channel matrix H describing the operation of the communications channel 105 on transmitted symbols. The channel matrix H may provide a representation of effects such as reflections in the communications channel. The channel matrix H may vary over time, and may be calculated periodically in some examples. While a single communications channel 105 is illustrated in FIG. 1, any number of communications channels may be used.

Any number of communications devices may be included in the communications system 100, including the communications devices 115, 116, and 117. Although not shown, the communications devices 116 and 117 may include analogous components to those shown in mobile station 115. The communications devices 115, 116, and 117 may be implemented as mobile stations in some examples.

Figure 2:
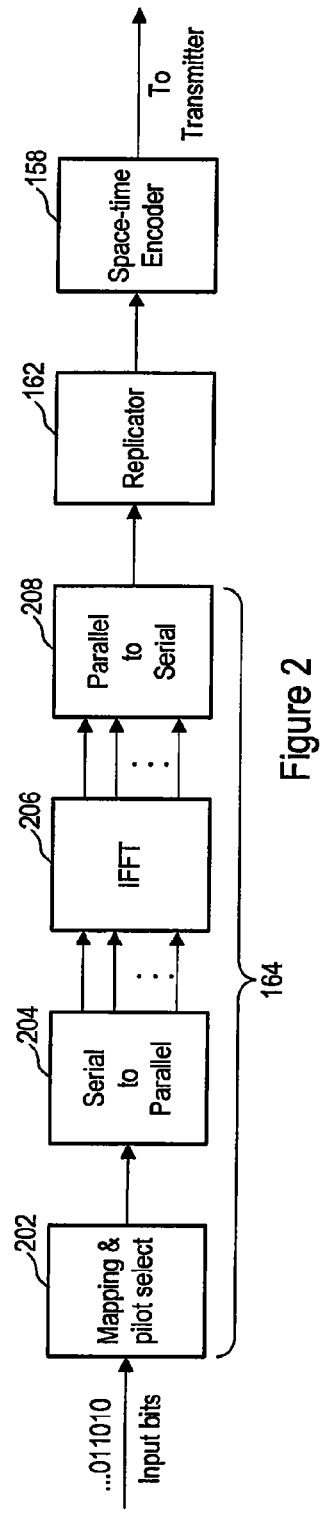
FIG. 2 is a schematic illustration of components of the communications device 110 arranged in accordance with examples of the present disclosure.

FIG. 2 is a schematic illustration of components of the communications device 110 arranged in accordance with examples of the present disclosure. The modulator 164 may include a mapping and pilot insertion block 202, which may be coupled to a serial to parallel converter 204, which may be coupled to an inverse Fourier transform (IFFT) block 206, which may be coupled to a parallel to serial converter 208. The replicator 162 may be coupled to the parallel to serial converter 208. The encoder 158 may be coupled to the replicator 162.

During operation, data for transmission over a communications channel may be provided to the mapping and pilot insertion block 202, which may be configured to map the data to symbols and insert pilot symbols into the data stream. In some examples, the pilot symbols may be inserted at a later point in the signal processing stream. The serial to parallel converter 204, IFFT 206, and parallel to serial converter 208 may be configured to modulate the data stream in accordance with an OFDM technique to generate multiple data streams for transmission over the communications channel. The replicator 162 may replicate a portion of the modulated data such that some data symbols from one stream are inserted into another stream. The space-time encoder 158 may then encode the data streams, including inserted symbols, for transmission over the communications channel. The configuration of FIG. 2 may provide for space-time encoding of the data streams.

Figure 3:
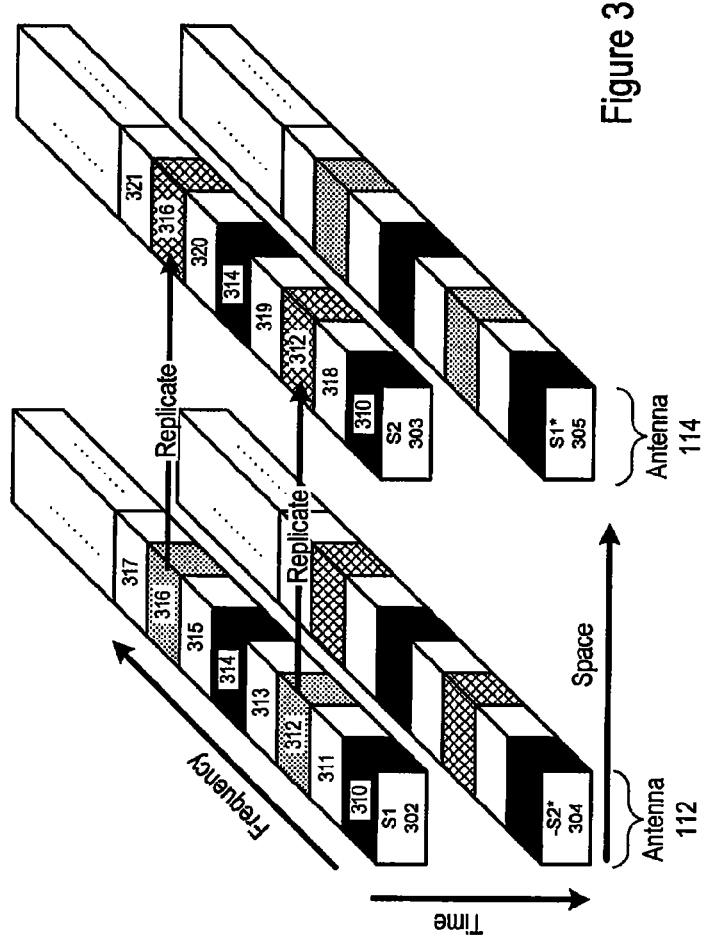
FIG. 3 is a schematic illustration of signals transmitted over a communications channel in accordance with examples of the present disclosure.

FIG. 3 is a schematic illustration of signals transmitted over a communications channel in accordance with examples of the present disclosure. The signals 302, 303, 304, and 305 of FIG. 3 may be transmitted by the transmitter 160 of FIG. 1 in some examples, and received by the receiver 172. The example of FIG. 3 illustrates signals encoded using a space-time block coding technique. In particular, signals 302 and 303 may be transmitted during a first time period while signals 304 and 305 are transmitted during a second time period. Signals 302 and 304 may be transmitted from one location, such as by the antenna 112 of FIG. 1. Signals 303 and 305 may be transmitted from another location, such as by the antenna 114 of FIG. 1. The relationships between the signals 302, 303, 304, and 305 may generally be specified by the space-time coding technique used. Each of the illustrated signals may encode multiple data symbols, shown as boxes in FIG. 3. For example, the signal 302 may encode the symbols 310-317. Pilot symbols may also be encoded by the signals. In the example of FIG. 3, the symbols 310 and 314 may represent pilot symbols. The pilot symbols 310 and 314 may accordingly also be present at similar frequencies in the signal 303. Further, replicated data symbols from the signal 302 may be included in the signal 303. In this example of FIG. 3, the data symbols 312 and 316 may have been replicated to symbol locations at corresponding frequencies at the second spatial location, as shown. Additional data symbols 318-321 may be included in the signals 303.

The example of FIG. 3 illustrates replicated data symbols inserted at a midpoint between two pilot symbols in a data stream. In other examples, replicated data symbols may be inserted at a location other than a midpoint between two pilot symbols, and the replicated data symbol may be inserted at a location closer to one pilot symbol than another. In some examples, some pilot symbols may have no replicated data symbols inserted between them. In general, any number or arrangement of replicated data symbols may be inserted into a data stream. As will be described further below, the replicated data symbols may be utilized in a manner similar to pilot symbols to estimate the communications channel. Since the replicated data symbols also encode data, the use of replicated data symbols as pilot symbols may increase the data rate of the over communications system in some examples.

Figure 4:
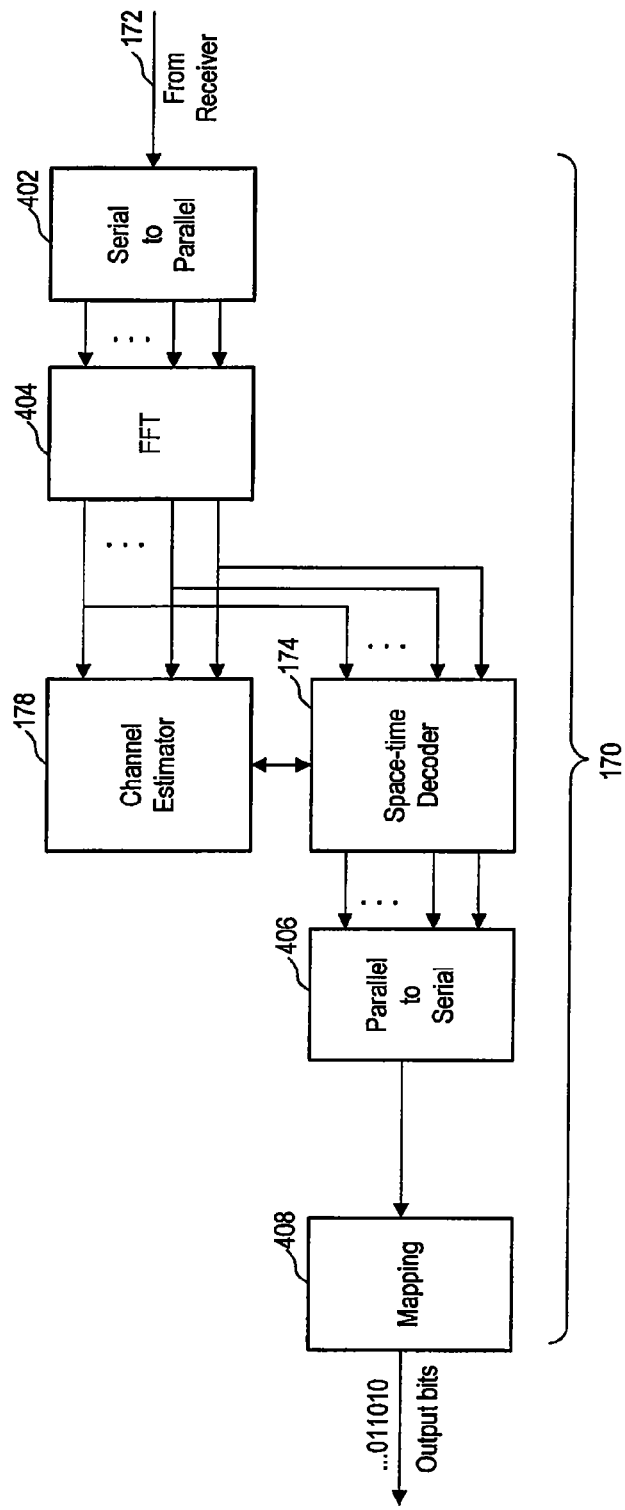
FIG. 4 is a schematic illustration of components of the communications device 115 arranged in accordance with examples of the present disclosure.

FIG. 4 is a schematic illustration of components of the communications device 115 arranged in accordance with examples of the present disclosure. The demodulator 170 may include a serial to parallel converter 402, a fast Fourier transform unit (FFT) 404, a parallel to serial converter 406, and a mapping block 408. The serial to parallel converter 402 may be coupled to the FFT 404. The FFT 404 may be coupled to the channel estimator and a space-time decoder 174. The space-time decoder 174 may be coupled to the parallel to serial converter 406. The parallel to serial converter 406 may be coupled to the mapping block 408.

In operation, signals received by the receiver 172, such as the signals 302-305 of FIG. 3, may be provided to the serial to parallel converter 402 and converted into parallel streams. The FFT 404 may perform a Fourier transform of the streams, and provide the Fourier transformed signals to the channel estimator 178 and the space-time decoder 174. In accordance with the methods described below, the channel estimator 178 may estimate all or a portion of the channel matrix based on received pilot symbols and/or replicated data symbols. The space-time decoder 174 may decode the data streams in accordance with the estimated channel matrix. Moreover, the space-time decoder 174 may provide signals indicative of the replicated data symbols to the channel estimator 178. The replicated data symbols may be used by the channel estimator 178 to estimate all or a part of the channel matrix, or to update an estimate of the channel matrix. Decoded signals may be provided from the space-time decoder 174 to the parallel-to-serial converter 406 and converted into a serial data stream of decoded symbols. The symbols may be provided to the mapping block 408 and may be converted into a stream of output data. In this manner, data may be encoded, transmitted, received, and decoded in the communications system in some examples.

In some examples, the positioning of the encoder and decoder relative to the FFT and IFFT blocks of the modulator may vary. In particular, the configuration shown in FIG. 4 may correspond to examples using space-time coding and decoding techniques. In some examples, space-frequency coding and decoding may be used. In examples where space-frequency coding is used, the encoder 158 may be coupled between the serial to parallel converter 204 and the IFFT 206.

Figure 5:
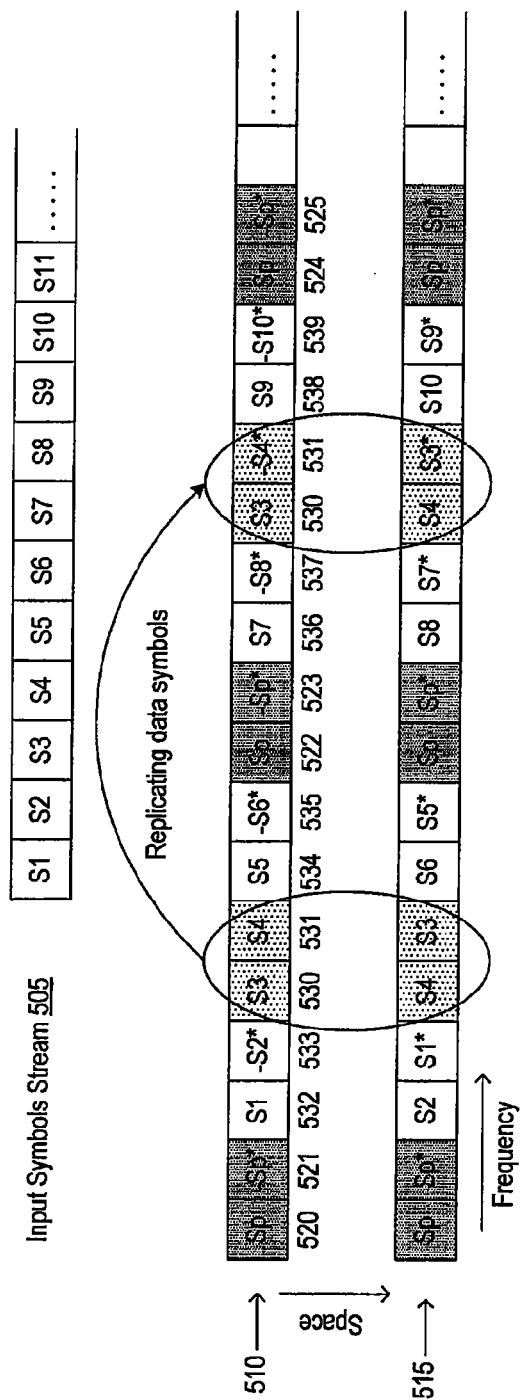
FIG. 5 is a schematic illustration of signals transmitted over the communications channel in accordance with some examples of the present disclosure.

FIG. 5 is a schematic illustration of signals transmitted over the communications channel in accordance with some examples of the present disclosure. The example shown in FIG. 5 may pertain to examples employing space-frequency coding techniques. Input data symbols 505 including symbols labeled S1-S11 may be provided to the modulator 164 of FIG. 1. Following modulation, pilot insertion, data replication, and coding in accordance with a space-frequency coding technique, one signal stream 510 may be generated for transmission from a first location, such as the antenna 112 of FIG. 1, and a second signal stream 515 may be generated for transmission from a second location, such as the antenna 114 of FIG. 1. The relationship between the symbols in the streams 510 and 515 is generally specified by the space-frequency coding technique.

Pilot symbols 520-525 are shown in the data stream 510, with corresponding data symbols in the data stream 515. Data symbols 530-539 are included in the data stream 510, with corresponding data symbols in the data stream 515. The pilot symbols 520-525 have been inserted amongst the data symbols 530-539. Data symbols 530 and 531 have been replicated from one frequency to another frequency in the data streams 510 and 515. The replicated data symbols have been inserted at a location between the pilot symbols 523 and 524. As generally described above, any number or positioning of replicated data symbols may generally be used. In the example shown in FIG. 5, data symbols have been replicated in pairs. Replicating a pair of data symbols may be advantageous in some examples for consistency with the coding technique employed to code the data stream.

Figure 6:
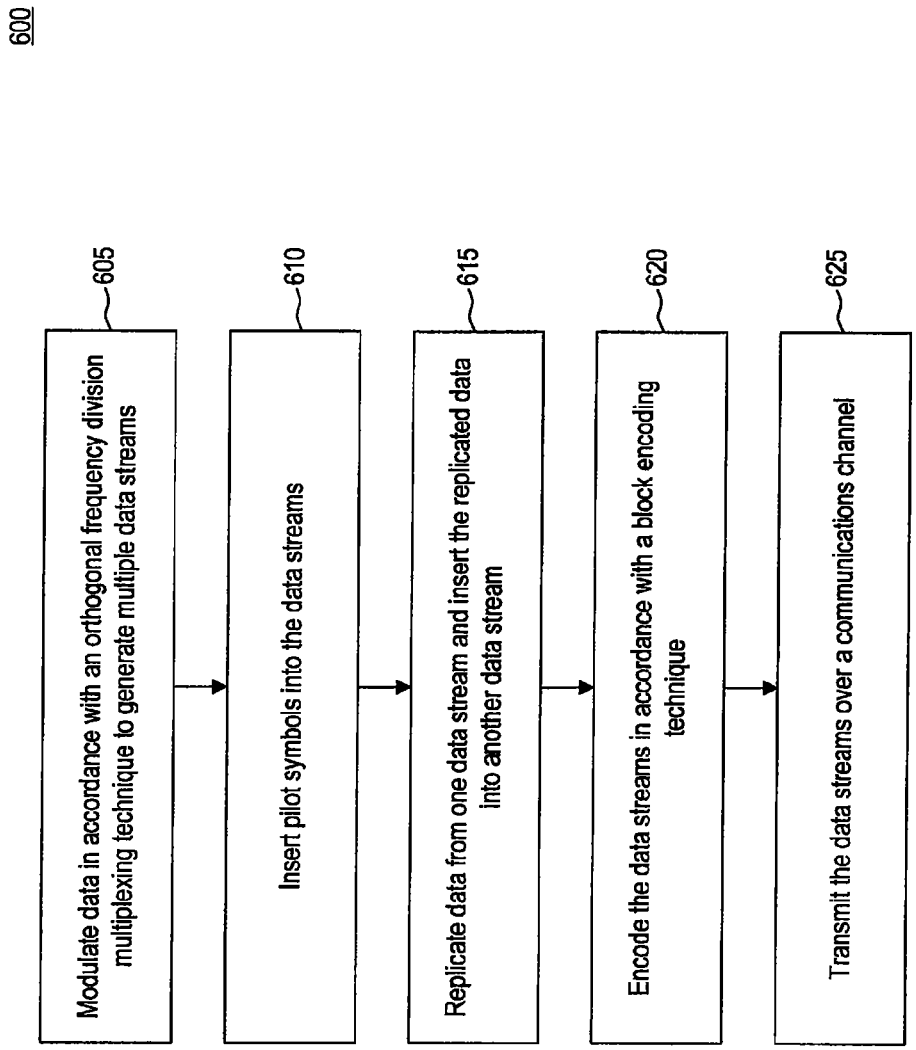
FIG. 6 is an example method for transmitting signals over a communications channel arranged in accordance with an example of the present disclosure.

FIG. 6 is an example method for transmitting signals over a communications channel arranged in accordance with an example of the present disclosure. The method may include one or more of blocks 605, 610, 615, 620, and/or 625. The various blocks described herein may be performed sequentially, in parallel, or in a different order than those described herein. It should also be appreciated that in some implementations one or more of the illustrated blocks may be eliminated, combined or separated into additional blocks. The method 600 may include block 605, "Modulate data in accordance with an orthogonal frequency division multiplexing technique to generate multiple data streams." Block 605 may be followed by block 610 "Insert pilot symbols into the data streams." Block 610 may be followed by block 615 "Replicate data from one data stream and insert the replicated data into another data stream." Block 615 may be followed by block 620 "Encode the data streams in accordance with a block encoding technique." Block 620 may be followed by block 625 "Transmit the data streams over a communications channel."

Data may be modulated in accordance with an OFDM technique in block 605. The modulation may be performed, for example, by any suitable structure in a communications device, such as a DSP or other processing unit. In some examples, one data stream may be generated for each antenna to be used in transmitting the data over the communications channel.

In block 610, pilot symbols may be inserted into the data streams. The insertion may be performed, for, example, by any suitable structure in a communications device, including a mixer or multiplexor. Generally, the pilot symbols correspond to symbols known by the transmitting and receiving devices of a communications system. By decoding signals encoding a known pilot symbol, a receiving device may generate an estimate of the channel matrix of the communications channel. Pilot symbols may be stored in any memory structure in communication with the communications device, or may be communicated to the communications device. Any number of pilot symbols may generally be inserted into the data streams with substantially any spacing. The more pilot symbols are inserted into the data streams, the more the overall data transmission rate of the communications system may decrease. However, in examples having more pilot symbols inserted into the data streams, the estimates of the channel matrix by a receiving communications device may be more accurate. Accordingly, there may be a tradeoff between data rate and accuracy of the channel estimation. As will be described further below, use of replicated data symbols as pilot symbols may advantageously increase the channel estimation accuracy while not impacting the overall data rate as severely as using more pilot symbols.

In block 615, data may be replicated from one data stream and inserted into another data stream. The replication may be performed by any suitable structure in a communications device, including a mixer or multiplexor for example. In some examples, a same structure may be used to insert the replicated data as was used to insert the pilot symbols. The replicated data may include one or more symbols from a data stream. In some examples, pairs of symbols may be replicated. The data may be inserted such that it is transmitted at a same frequency band in each of the data streams. Any number of replicated data instances may be included in a transmission. As will be described further below, the replicated data may be utilized to improve estimates of a channel matrix associated with a communications channel. Accordingly, as more replicated data is inserted, the accuracy of the channel matrix estimate may increase. However, as more replicated data is inserted, the overall data rate of the communications system may be reduced, although the reduction may not be as severe as if more known pilot symbols were inserted. The replicated data may be inserted between two pilot symbols, and may be inserted at a midpoint between the two pilot symbols. However, the replicated data may be inserted at substantially any location in some examples.

In block 620, the data streams may be encoded in accordance with a block encoding technique. The encoding may be performed by any suitable structure in a communications device, for example by a DSP or other processing unit. As described above, any block encoding technique may be used, including space-time coding or space-frequency coding.

In block 625, the data streams may be transmitted over a communications channel. The transmission may be performed by a transmitter acting in cooperation with one or more antennas in some examples. In some examples, each antenna may be used to transmit one of the data streams.

Figure 7:
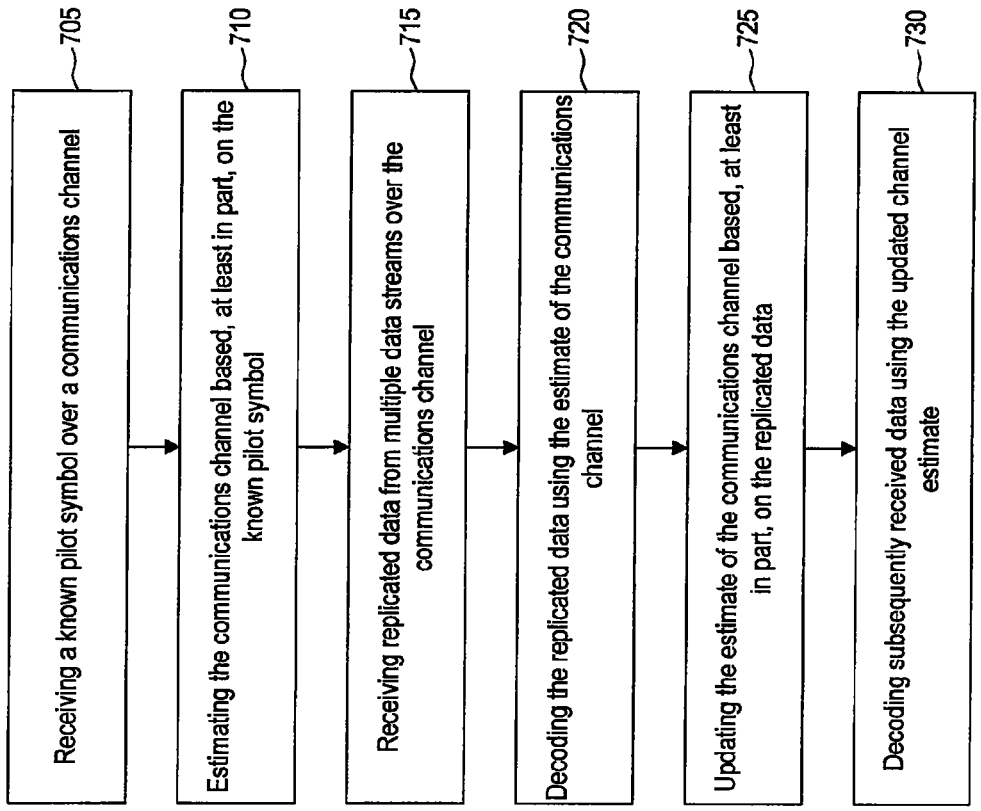
FIG. 7 is an example method for receiving signals over a communications channel arranged in accordance with an example of the present disclosure.

FIG. 7 is an example method for receiving signals over a communications channel arranged in accordance with an example of the present disclosure. The method 700 may include one or more of blocks 705, 710, 715, 720, 725, and/or 730. The various blocks described herein may be performed sequentially, in parallel, or in a different order than those described herein. It should also be appreciated that in some implementations one or more of the illustrated blocks may be eliminated, combined or separated into additional blocks. The method 700 may include block 705 "Receiving a known pilot symbol over a communications channel." Block 705 may be followed by block 710 "Estimating the communications channel based, at least in part, on the known pilot symbol." Block 710 may be followed by block 715 "Receiving replicated data from multiple data streams over the communications channel." Block 715 may be followed by block 720 "Decoding the replicated data using the estimate of the communications channel." Block 720 may be followed by block 725 "Updating the estimate of the communications channel based, at least in part, on the replicated data." Block 725 may be followed by block 730 "Decoding subsequently received data using the updated channel estimate."

In block 705, a known pilot symbol may be received over a communications channel. The symbol may be received by any suitable receiver of a communications device. Signals may generally be received that encode the known pilot symbol. The received signals may also provide an indication that the encoded symbol is a pilot symbol.

In block 710, the communications channel may be estimated based, at least in part, on the received pilot symbol. The estimation may be performed by any suitable structure of a communications device, such as a DSP or other processing unit. Generally, all or a portion of a channel matrix may be estimated by comparing a decoded received pilot symbol with the known pilot symbol. Known pilot symbols may be stored at the communications device or otherwise communicated to the communications device for comparison with decoded pilot symbols received over the communications channel. The estimated channel, including data estimating all or a portion of a channel matrix, may be stored in some examples.

In block 715, replicated data from multiple data streams may be received over the communications channel. Any suitable receiver may be used to receive the replicated data. Examples of replicated data have been described above. Generally, signals are received that may encode the replicated data and the signals may also encode an indication that the data includes one or more replicated data symbols. Signals encoding the replicated data may be received by a single antenna in some examples.

In block 720, the replicated data may be decoded using the estimate of the communications channel. Any suitable structure of a communications device may be used to perform the decoding, such as a DSP or other processing unit. In some examples, a joint detection technique is used to decode the replicated data, such as max-ratio combining. By decoding multiple copies of the replicated data, the decoding may be considered to be more accurate than the decoding of single data symbols. Accordingly, the decoded replicated data may be used to generate or update an estimate of the communications channel.

In block 725, the estimate of the communications channel may be updated based, at least in part, on the replicated data. The updating may be performed by any suitable structure in a communications device, such as a DSP or other processing unit. The estimate may be updated by comparing the decoded symbol with the two instances of received signals encoding the symbol. In this manner, the channel estimate may be generated or updated, which may include all or a portion of the channel matrix. The updated channel estimate may be stored in some examples.

In block 730, subsequently received data may be decoded using the updated channel estimate. That is, signals received following the updating of the channel estimate may be decoded using the updated channel estimate. The updated channel estimate may improve decoding performance in some examples.

Accordingly, examples have been described above of estimating a communications channel based on pilot symbols and replicated data symbols. In this manner, the number of pilot symbols may be effectively increased through the use of replicated data symbols. The accuracy of the resultant channel estimates may in some examples approach the accuracy of an example where the effective number of inserted pilot symbols is equal to a sum of the number of pilot symbols plus the number of inserted replicated data symbols. Because the replicated data symbols also transmit data over the communications channel, however, the use of replicated data symbols may not impair the overall data rate of the system as severely as the use of more pilot symbols.

Figure 8:
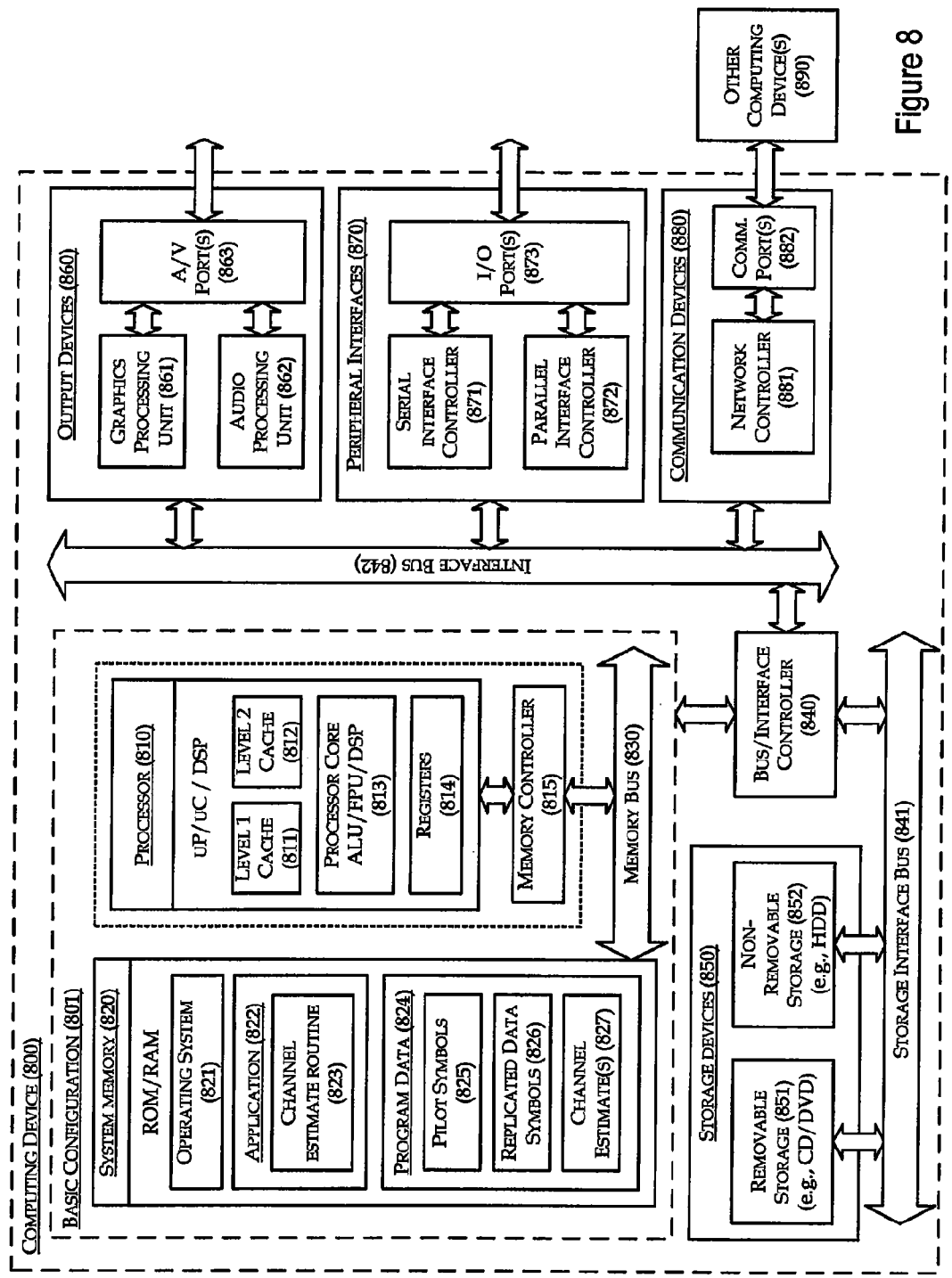
FIG. 8 is a block diagram illustrating an example computing device 800 that is arranged for generating an updated channel estimate in accordance with examples of the present disclosure.

FIG. 8 is a block diagram illustrating an example computing device 800 that is arranged for generating an updated channel estimate in accordance with examples of the present disclosure. In a very basic configuration 801, computing device 800 typically includes one or more processors 810 and system memory 820. A memory bus 830 may be used for communicating between the processor 810 and the system memory 820.

Depending on the desired configuration, processor 810 may be of any type including but not limited to a microprocessor (μP), a microcontroller (μC), a digital signal processor (DSP), or any combination thereof. Processor 810 may include one more levels of caching, such as a level one cache 811 and a level two cache 812, a processor core 813, and registers 814. An example processor core 813 may include an arithmetic logic unit (ALU), a floating point unit (FPU), a digital signal processing core (DSP Core), or any combination thereof. An example memory controller 815 may also be used with the processor 810, or in some implementations the memory controller 815 may be an internal part of the processor 810.

Depending on the desired configuration, the system memory 820 may be of any type including but not limited to volatile memory (such as RAM), non-volatile memory (such as ROM, flash memory, etc.) or any combination thereof. System memory 820 may include an operating system 821, one or more applications 822, and program data 824. Application 822 may include a channel estimate routine 823 that is arranged to generate an estimate of a communications channel based on received pilot symbols, replicated data symbols, or combinations thereof. Program Data 824 may include known pilot symbols 825, replicated data symbols 826, channel estimate 827, or combinations thereof, that may be useful for generating channel estimates as generally described above. In some embodiments, application 822 may be arranged to operate with program data 824 on an operating system 821 such that channel estimates are generated and/or updated on the basis of received pilot symbols and replicated data symbols. This described basic configuration is illustrated in FIG. 8 by those components within dashed line 801.

Computing device 800 may have additional features or functionality, and additional interfaces to facilitate communications between the basic configuration 801 and any required devices and interfaces. For example, a bus/interface controller 840 may be used to facilitate communications between the basic configuration 801 and one or more data storage devices 850 via a storage interface bus 841. The data storage devices 850 may be removable storage devices 851, non-removable storage devices 852, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 820, removable storage 851 and non-removable storage 852 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of device 800.

Computing device 800 may also include an interface bus 842 for facilitating communication from various interface devices (e.g., output interfaces, peripheral interfaces, and communication interfaces) to the basic configuration 801 via the bus/interface controller 840. Example output devices 860 include a graphics processing unit 861 and an audio processing unit 862, which may be configured to communicate to various external devices such as a display or speakers via one or more A/V ports 863. Example peripheral interfaces 870 include a serial interface controller 870 or a parallel interface controller 872, which may be configured to communicate with external devices such as input devices (e.g., keyboard, mouse, pen, voice input device, touch input device, etc.) or other peripheral devices (e.g., printer, scanner, etc.) via one or more I/O ports 873. An example communication device 880 includes a network controller 881, which may be arranged to facilitate communications with one or more other computing devices 890 over a network communication link via one or more communication ports 882.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 800 may also be implemented as a personal computer including both laptop computer and non-laptop computer configurations.

The present disclosure is not to be limited in terms of the particular examples described in this application, which are intended as illustrations of various aspects. Many modifications and examples can may be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and examples are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular examples only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 items refers to groups having 1, 2, or 3 items. Similarly, a group having 1-5 items refers to groups having 1, 2, 3, 4, or 5 items, and so forth.

While the foregoing detailed description has set forth various examples of the devices and/or processes via the use of block diagrams, flowcharts, and/or examples, such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one example, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the examples disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. For example, if a user determines that speed and accuracy are paramount, the user may opt for a mainly hardware and/or firmware vehicle; if flexibility is paramount, the user may opt for a mainly software implementation; or, yet again alternatively, the user may opt for some combination of hardware, software, and/or firmware.

In addition, those skilled in the art will appreciate that the mechanisms of the subject matter described herein are capable of being distributed as a program product in a variety of forms, and that an illustrative example of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Versatile Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A method of decoding a signal transmitted over a communications channel, the method comprising:
   receiving a pilot symbol over the communications channel;
   estimating a channel matrix of the communications channel based, at least in part, on the pilot symbol;
   receiving replicated data from multiple data streams transmitted over the communications channel;
   decoding the replicated data using the estimated channel matrix;
   generating an updated estimate of the channel matrix based, at least in part, on the replicated data; and
   decoding subsequently received signals over the communications channel using the updated estimate of the channel matrix.

2. The method of claim 1 wherein said decoding the replicated data comprises using a joint detection technique.

3. The method of claim 1, wherein said decoding the replicated data comprises using a space-time block decoding technique.

4. The method of claim 1, wherein said decoding the replicated data comprises using a space-frequency block decoding technique.

5. The method of claim 1, wherein the replicated data includes same data symbols in multiple data streams.

6. A communication device comprising:
   a receiver configured to receive signals over a communications channel, wherein the signals are based at least in part on first and second data streams transmitted over a communications channel, wherein the second data stream includes at least one data symbol replicated from the first data stream;
   a decoder coupled to the receiver and the channel estimator, wherein the decoder is configured to receive the received signals and decode the at least one data symbol replicated from the first data stream;
   a channel estimator coupled to the decoder and the receiver, wherein the channel estimator is configured to receive the received signals and the decoded at least one data symbol, wherein the channel estimator is configured to estimate a channel matrix of the communications channel based, at least in part, on the decoded at least one data symbol; and
   wherein the decoder is further configured to decode subsequent received signals based, at least in part, on the estimate of the channel matrix.

7. The communication device of claim 6 wherein the decoder is configured to decode the at least one data symbol using a joint detection technique.

8. The communication device of claim 6 wherein the first and second data streams each further include at least one pilot symbol, and wherein the channel estimator is configured to receive the at least one pilot symbol and generate an initial estimate of the channel matrix based, at least in part on the at least one pilot symbol.

* * * * *